United States Patent
Malvestio

(10) Patent No.: US 7,467,683 B2
(45) Date of Patent: Dec. 23, 2008

(54) STEERING AXLE FOR VEHICLES

(75) Inventor: Luciano Malvestio, Villanova di Camposampiero (IT)

(73) Assignee: Carraro S.p.A., Campodarsego (PD) (IT)

( * ) Notice: Subject to any disclaimer, the term of this patent is extended or adjusted under 35 U.S.C. 154(b) by 281 days.

(21) Appl. No.: 11/350,450

(22) Filed: Feb. 9, 2006

(65) Prior Publication Data

US 2006/0180384 A1    Aug. 17, 2006

(30) Foreign Application Priority Data

Feb. 11, 2005    (IT) .......................... PD2005A0032

(51) Int. Cl.
*B60K 17/30* (2006.01)
(52) U.S. Cl. .................. 180/266; 180/252; 280/93.504; 280/12.14
(58) Field of Classification Search ................. 180/266, 180/79.4, 252; 280/12.14, 97, 93.504
See application file for complete search history.

(56) References Cited

U.S. PATENT DOCUMENTS

| | | | | |
|---|---|---|---|---|
| 3,063,173 A | * | 11/1962 | Wardle | 37/408 |
| 3,783,966 A | * | 1/1974 | Campbell et al. | 180/433 |
| 4,141,422 A | * | 2/1979 | Hatz | 180/54.1 |
| 4,600,072 A | * | 7/1986 | Krude | 180/348 |
| 5,046,577 A | * | 9/1991 | Hurlburt | 180/266 |
| 5,322,309 A | | 6/1994 | Hurlburt | |
| 5,447,320 A | * | 9/1995 | Hurlburt | 280/93.504 |
| 7,144,022 B2 | * | 12/2006 | Bordini | 280/124.109 |
| 2002/0106108 A1 | * | 8/2002 | Benson et al. | 382/104 |

* cited by examiner

*Primary Examiner*—Paul N Dickson
*Assistant Examiner*—Tashiana Adams
(74) *Attorney, Agent, or Firm*—RatnerPrestia

(57) ABSTRACT

A steering axle for vehicles includes means for angularly displacing the axle body about a steering axis as a consequence of the relative displacement between the wheel hubs and the axle body, and vertical securing means are provided between the axle body and the bearing structure in order to hold the axle body secured vertically to the bearing structure during the lateral displacement, wherein the vertical securing means comprise an extensible member, the extension of which is correlated to the position of the axle body with respect to the second steering axis.

12 Claims, 1 Drawing Sheet

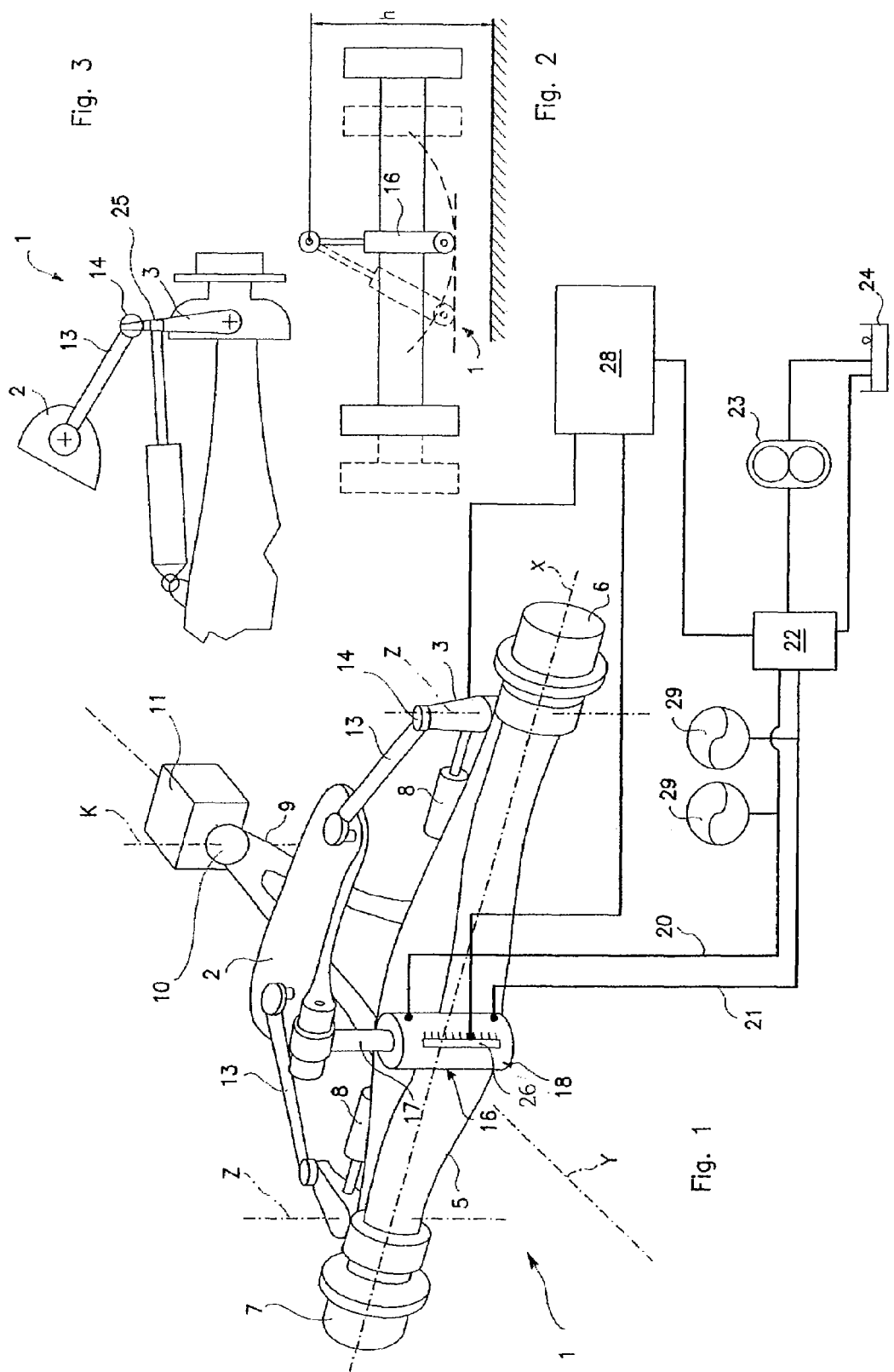

STEERING AXLE FOR VEHICLES

The subject of the present invention is a steering axle for vehicles of the type including the characteristics mentioned in the preamble of the main claim.

Axles of this type find their main, but not exclusive, application in the field of agricultural tractors and are known in that field as "super steering" axles or uprated steering axles.

This type of axle has the particular feature that in the action of steering, to the rotation of the wheel hubs with respect to the body of the axle there corresponds a rotation of the axle body with respect to the bearing structure of the vehicle with consequent significant reduction of the minimum turning radius and therefore with a manoeuvring capacity of the vehicle that was previously inconceivable.

However, these axles have the general drawback that, to the angular displacement of the axle with respect to the bearing structure of the vehicle there corresponds an undesirable vertical displacement of the bearing structure which leads to a variation in the height from the ground of the nose of the tractor.

An example of a super steering axle is described in U.S. Pat. No. 5,322,309. In this earlier patent a mechanism is proposed which is aimed at limiting the vertical displacement of the bearing structure with respect to the axle as a consequence of the pivoting of the axle with respect to the second steering axis. The mechanism provides a double linkage between the axle and the bearing structure which compensates the vertical displacements by minimizing them. Such displacements are not however avoided, in particular for steering with a short radius and furthermore the structure adopted is necessarily rigid.

The problem overcome by the present invention is that of providing a steering axle of the super steering type which is structurally and functionally designed to make it possible to remedy all the drawbacks mentioned with reference to the prior art cited. This problem is confronted and solved by the invention by means of a steering axle produced according to the claims which follow.

The characteristics and advantages of the invention will become clearer from the detailed description of a preferred, but not exclusive, embodiment thereof illustrated by way of non-limiting example with reference to the appended drawings, in which:

FIG. 1 is a diagrammatic perspective view of a super steering axle according to the invention, FIG. 2 is a diagrammatic view in front elevation of the axle of FIG. 1 in two different operative positions;

FIG. 3 is a plan view from above of a detail of the axle of the preceding figures.

In the drawings, the reference 1 indicates as a whole a steering axle with super steering according to the present invention.

The axle 1 comprises a body 5 with axis X extending transversely with respect to the longitudinal axis Y of a vehicle on which the axle 1 is mounted. In FIG. 1 can be seen a plate 2 which belongs to the bearing structure of the aforesaid vehicle.

At the axially opposed ends of the axle body 5 a respective wheel hub 6, 7 is provided, each being rotatably secured to the axle body about a respective first steering axis Z. The wheel hubs 6, 7 are provided with respective steering arms 3. Between the steering arms 3 of the wheel hubs 6, 7 and the axle body 5, steering means are provided, for example of the type with hydraulic cylinders 8, which are intended to steer the wheel hubs about the first axis with respect to the axle body.

From the axle body 5 there extends in a median position an arm 9 perpendicular to the axis X and having at the end opposed to the axle body a spherical ball joint member 10 capable of being received in a ball joint seat 11 firmly connected to the bearing structure of the vehicle. In this way, the axle is pivotally secured to the bearing structure both for angular displacement about a second steering axis indicated by K and for vertical pivoting perpendicularly to the axis X, from and to the plate 2. The axle is further connected to the bearing structure of the vehicle by means of connecting rods 13, one end 14 of which is connected by an articulated joint to the respective wheel hub at the steering arm 3 while the opposite end is connected by an articulated joint to the plate 2.

Finally, an extensible vertical securing member is provided between the axle body and the bearing structure, being provided by a hydrodynamic cylinder 16 placed as a further connecting rod between the axle body and the bearing structure, with a rod 17 secured by an articulated joint to the plate 2 and a cylinder 18, also secured by an articulated joint to the body 5 of the axle.

The cylinder 16 is of the double-acting type connected via respective lines 20, 21 to a hydraulic centre 22 fed by a pump 23 via a reservoir 24.

A position sensor 25 is fitted on the steering means, for example between the steering arms 3 and the axle body, for detecting the relative angular position thereof with respect to the axle body 5. Equally, a position sensor 26 is fitted to the cylinder 16 for detecting the extension of same, for example by means of the relative position between cylinder and rod. The signals derived from the sensors 25, 26 are conveyed to a control unit 28 where they are processed in order to derive therefrom the signal for operation of the hydraulic centre 22, which provides for the adjustment of the extension of the cylinder according to the steering angle reached.

Provision is made for there to be placed on each of the feed and discharge lines 20, 21 for the cylinder 16 a hydraulic plenum chamber 29 via which the cylinder 16 also performs the function of damped suspension of the axle 1.

Owing to the possibility of varying the extension of the cylinder 16 it is possible to compensate as required the vertical displacement of the axle with respect to the bearing structure of the vehicle in relation to the steering angle. In fact, the conjoint detection of the signal derived from the sensors 25 and 26 makes it possible to keep constant (and adjust as required) the height from the ground h (FIG. 2) of the bearing structure, and in particular of the nose of the tractor, for any steering angle, by means of a corresponding variation of the extension of the cylinder 16. Furthermore, the function of suspension and shock-absorber performed by the cylinder 16 permits improved running comfort of the vehicle.

The invention claimed is:

1. A steering axle for vehicles including:
an axle body having axially opposed ends provided with a respective wheel hub hinged about a respective first steering axis, said axle body being in its turn hinged on to a bearing structure of the vehicle by means of an articulated joint spaced from the axle body for an angular displacement of said axle body with respect to the bearing structure about a second steering axis,
steering means acting between said wheel hubs and the axle body for steering said hubs about said first steering axis, said steering means including means for angularly displacing said axle body about the second steering axis as a consequence of the relative displacement between the wheel hubs and the axle body,
vertical securing means extending vertically between the axle body and the bearing structure in order to hold said axle body secured vertically to the bearing structure during said lateral displacement, wherein said vertical securing means comprise an extensible member, the extension of which is correlated to the position of the axle body with respect to the second steering axis.

2. The axle according to claim 1, wherein said extensible member is a shock-absorber member.

3. The axle according to claim 1, wherein said extensible member is a hydraulic cylinder.

4. The axle according to claim 3, wherein said hydraulic cylinder is connected by an articulated joint by one of its ends to the axle body and by its opposite end to said bearing structure.

5. The axle according to claim 1, wherein a first position sensor means is associated with the steering means and a second position sensor means is associated with said extensible member in order to vary the extension of this latter according to the steering angle determined by said steering means.

6. The axle according to claim 3, wherein said cylinder is connected to at least one hydraulic plenum chamber.

7. The axle according to claim 2, wherein said shock absorber member is a hydraulic cylinder.

8. The axle according to claim 2, wherein a first position sensor means is associated with the steering means and a second position sensor means is associated with said extensible member in order to vary the extension of this latter according to the steering angle determined by said steering means.

9. The axle according to claim 3, wherein a first position sensor means is associated with the steering means and a second position sensor means is associated with said extensible member in order to vary the extension of this latter according to the steering angle determined by said steering means.

10. The axle according to claim 4, wherein a first position sensor means is associated with the steering means and a second position sensor means is associated with said extensible member in order to vary the extension of this latter according to the steering angle determined by said steering means.

11. The axle according to claim 4, wherein said cylinder is connected to at least one hydraulic plenum chamber.

12. The axle according to claim 5, wherein said extensible member is a hydraulic cylinder and said cylinder is connected to at least one hydraulic plenum chamber.

* * * * *